(No Model.) 7 Sheets—Sheet 1.

T. CARROLL.
CASH REGISTER.

No. 499,192. Patented June 6, 1893.

WITNESSES:
Willis Barnes
Linus Barnes

INVENTOR
Thomas Carroll
BY
George L. Barnes
ATTORNEY.

(No Model.) 7 Sheets—Sheet 2.
T. CARROLL.
CASH REGISTER.
No. 499,192. Patented June 6, 1893.
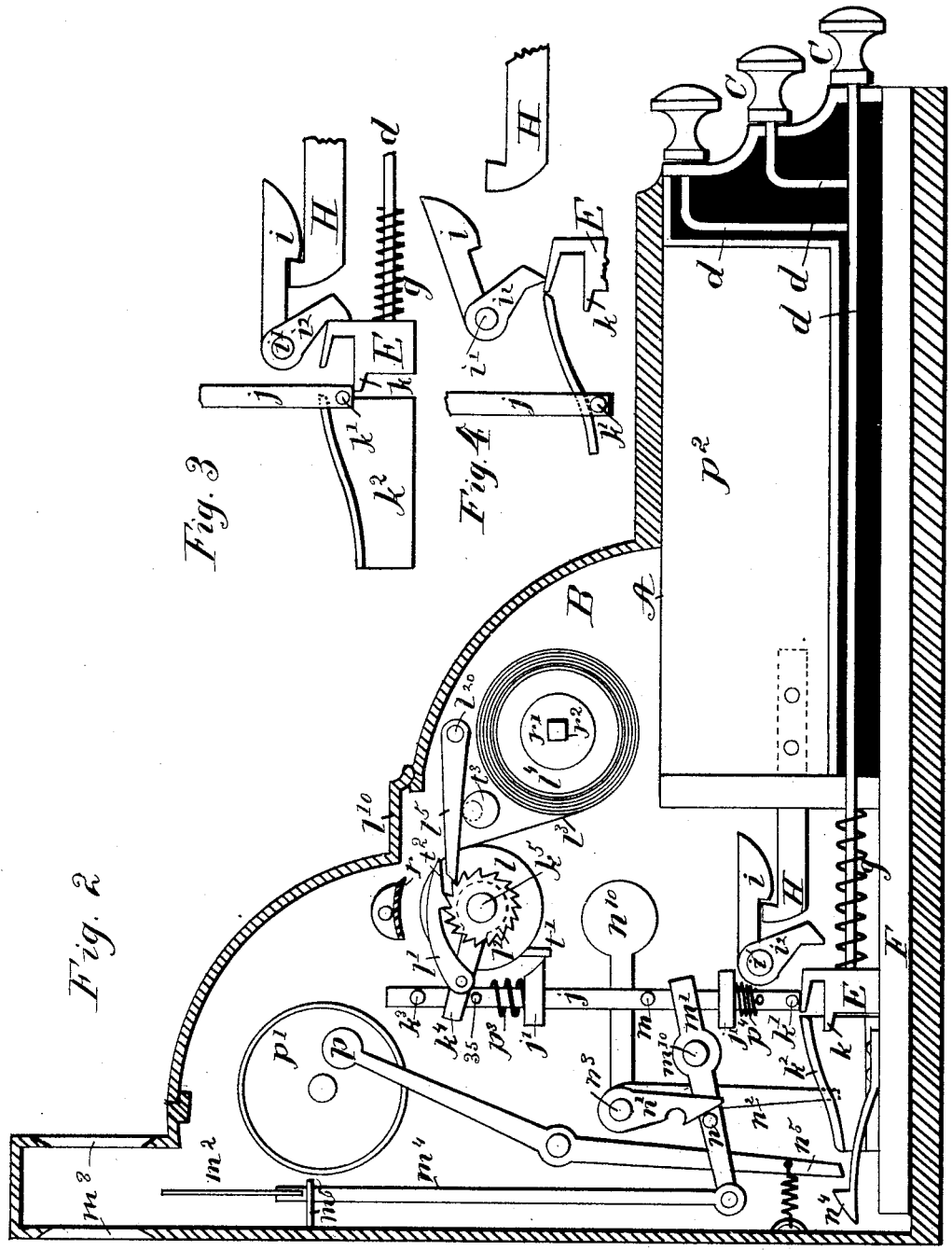
WITNESSES:
Willis Barnes
Linus Barnes
INVENTOR
Thomas Carroll
BY George L. Barnes
ATTORNEY.

(No Model.)  7 Sheets—Sheet 3.
T. CARROLL.
CASH REGISTER.
No. 499,192.  Patented June 6, 1893.
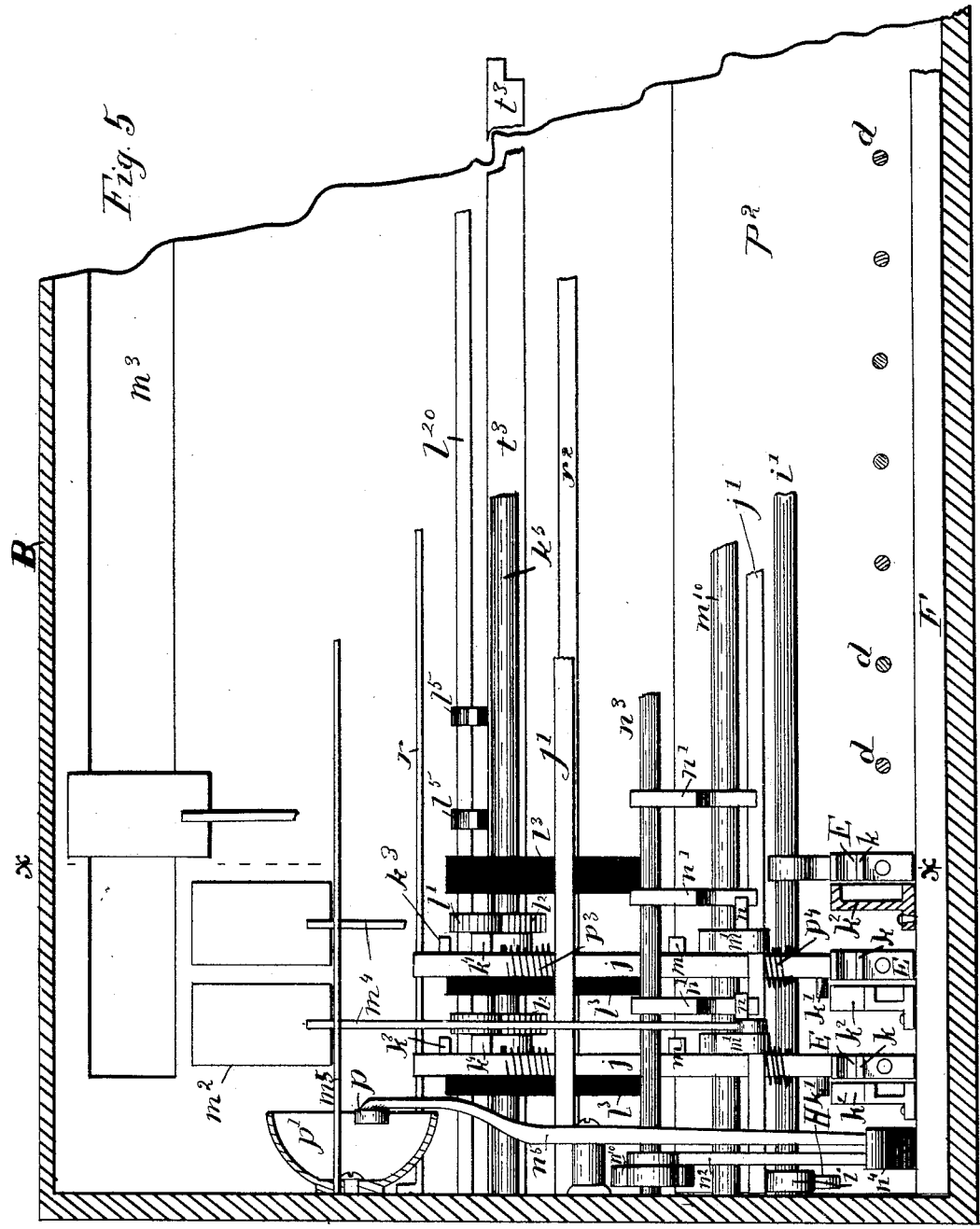
WITNESSES:
Willis Barnes
Linus Barnes
INVENTOR
Thomas Carroll
BY George L. Barnes
ATTORNEY.

(No Model.)  7 Sheets—Sheet 4.

T. CARROLL.
CASH REGISTER.

No. 499,192.  Patented June 6, 1893.

WITNESSES:
Linus Barnes
Willis Barnes

INVENTOR,
Thomas Carroll
By
George L. Barnes
ATTORNEY.

(No Model.) 7 Sheets—Sheet 5.

T. CARROLL.
CASH REGISTER.

No. 499,192. Patented June 6, 1893.

WITNESSES:
Linus Barnes
Willis Barnes

INVENTOR.
Thomas Carroll
By George L. Barnes
ATTORNEY.

(No Model.) 7 Sheets—Sheet 6.
T. CARROLL.
CASH REGISTER.
No. 499,192. Patented June 6, 1893.
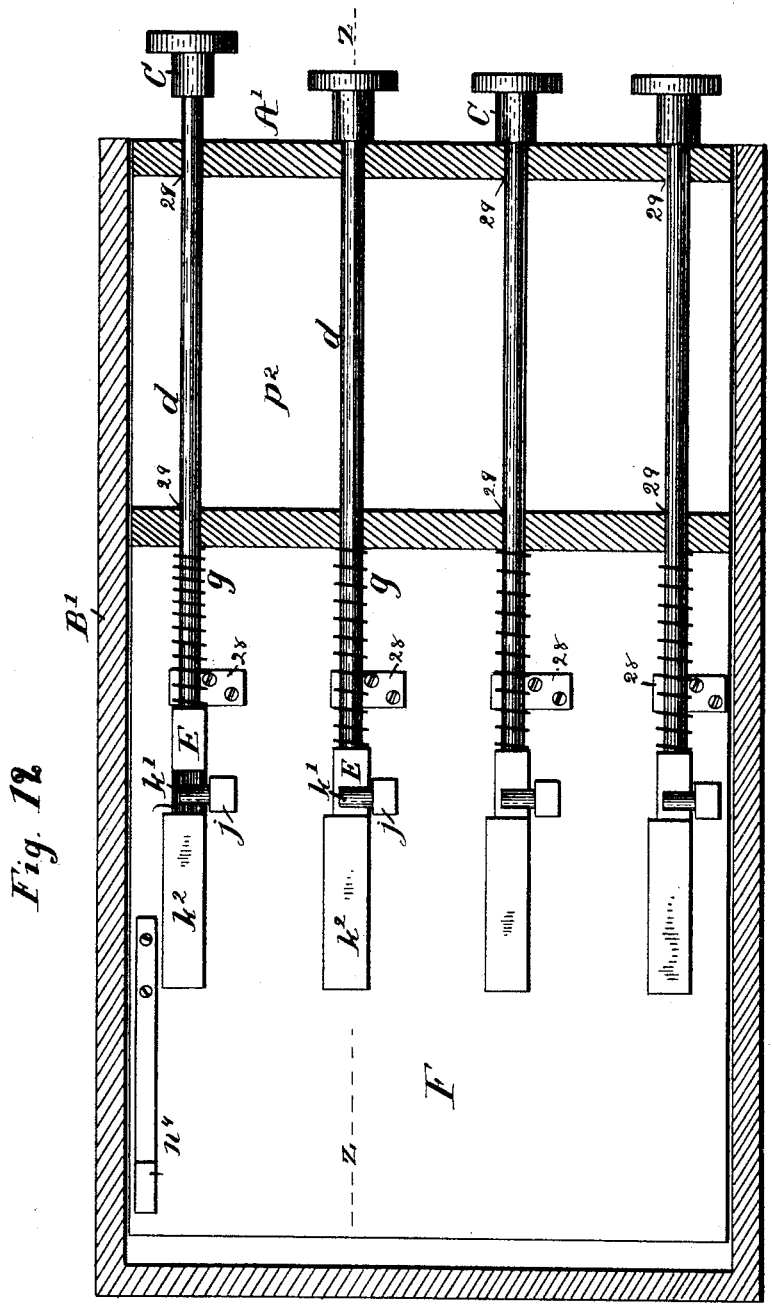
WITNESSES:
Linus Barnes
Willis Barnes
INVENTOR
Thomas Carroll
BY George L. Barnes
ATTORNEY.

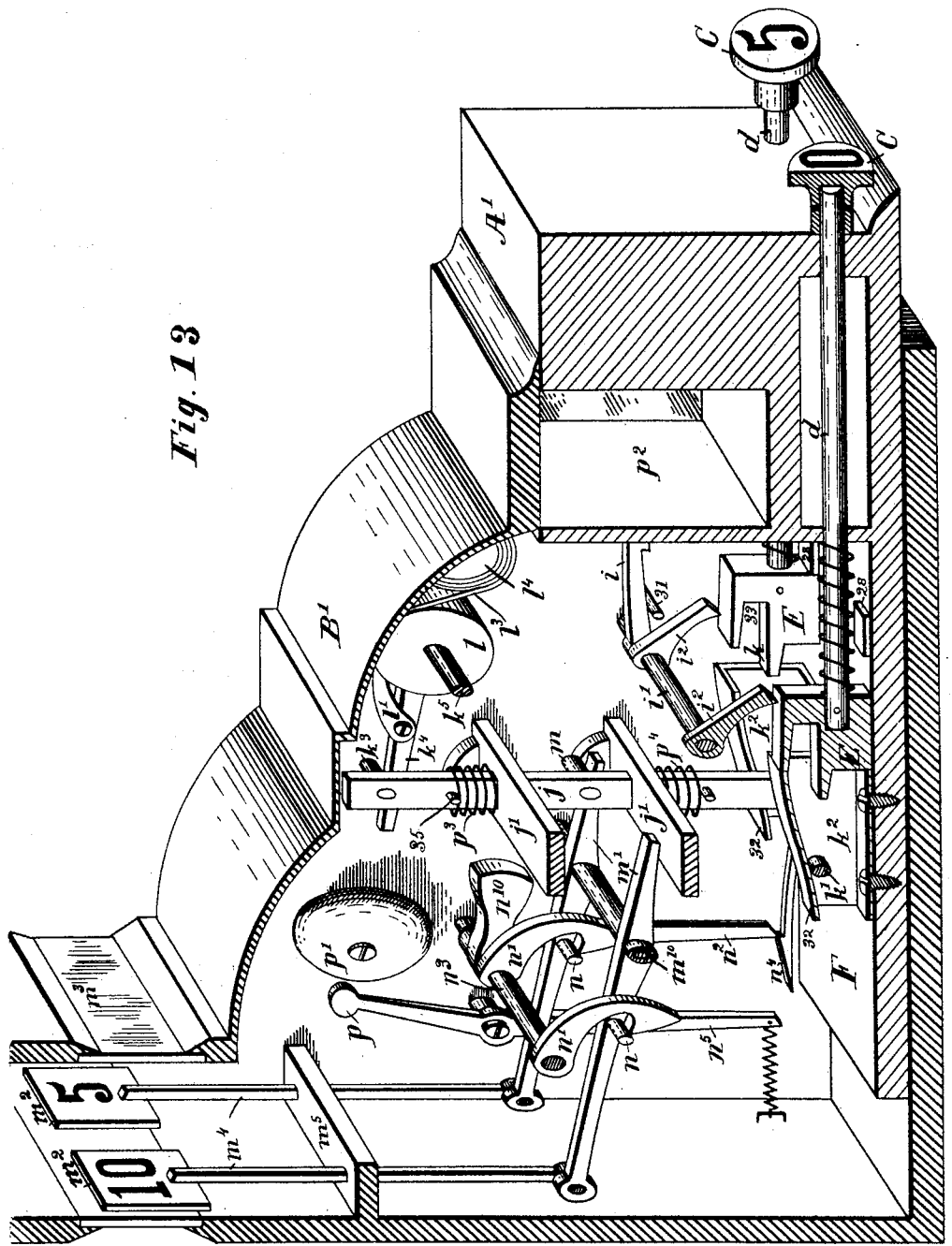

UNITED STATES PATENT OFFICE.

THOMAS CARROLL, OF NEW HAVEN, CONNECTICUT.

CASH-REGISTER.

SPECIFICATION forming part of Letters Patent No. 499,192, dated June 6, 1893.

Application filed June 16, 1892. Serial No. 436,967. (No model.)

*To all whom it may concern:*

Be it known that I, THOMAS CARROLL, a citizen of the United States, residing at New Haven, in the county of New Haven and State of Connecticut, have invented certain new and useful Improvements in Cash-Registers, of which the following is a specification, reference being had to the accompanying drawings, forming a part thereof, in which—

Figure 9:
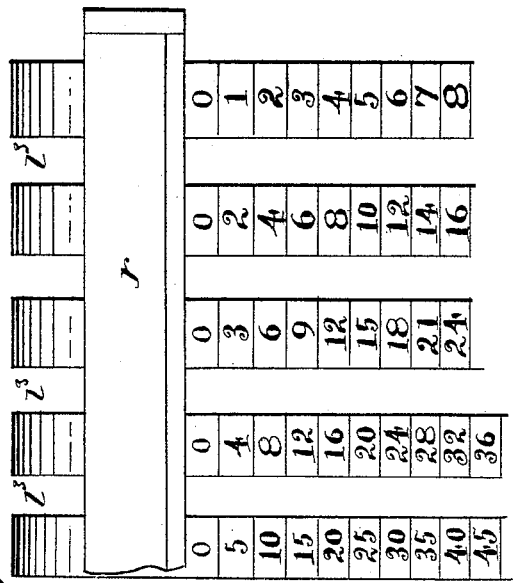
Figure 1:
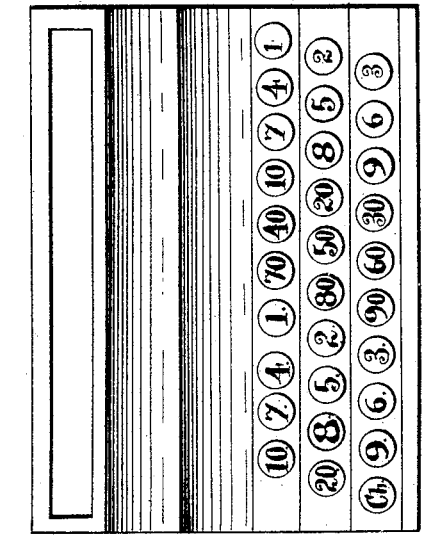
Figure 10:
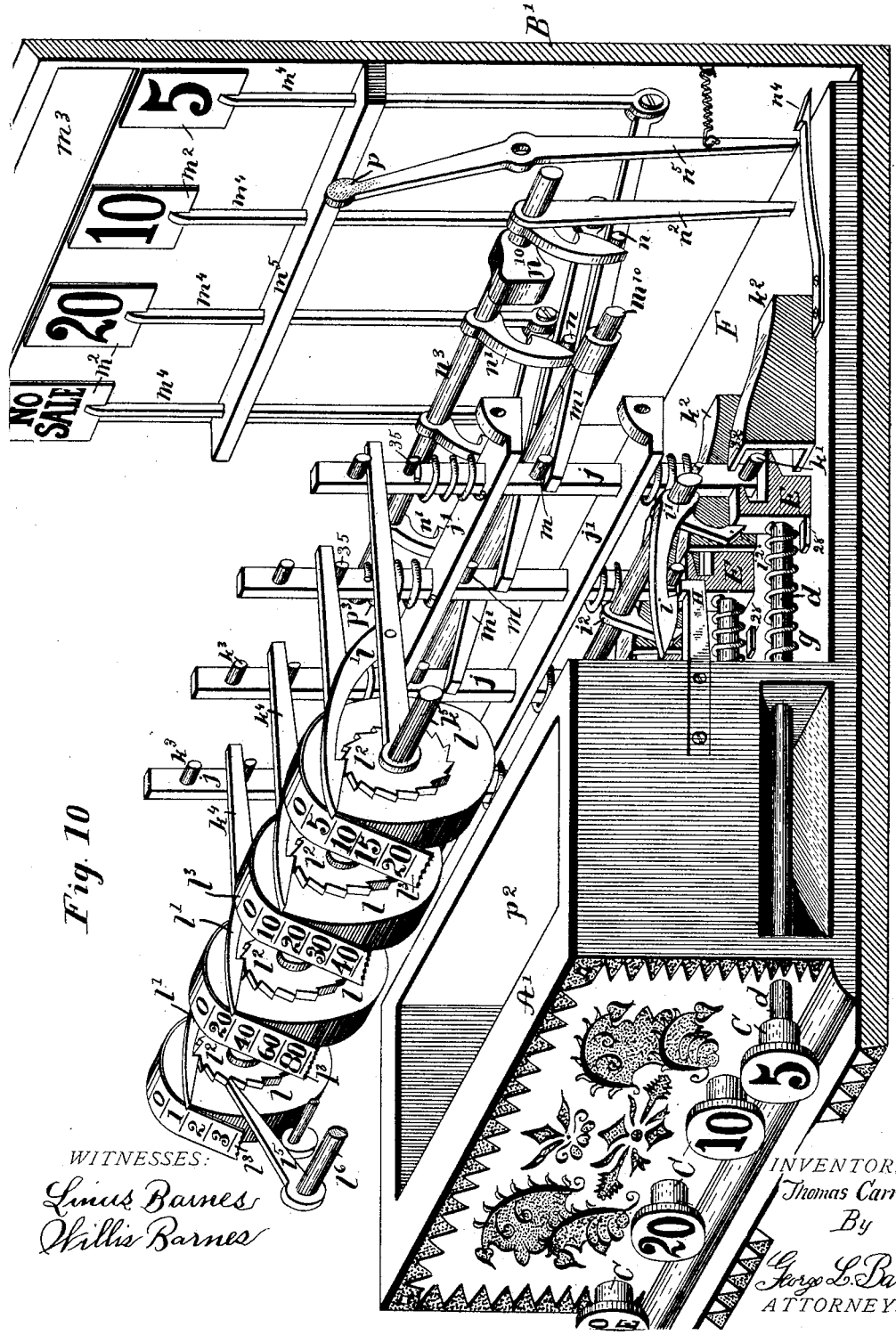
Figure 11:
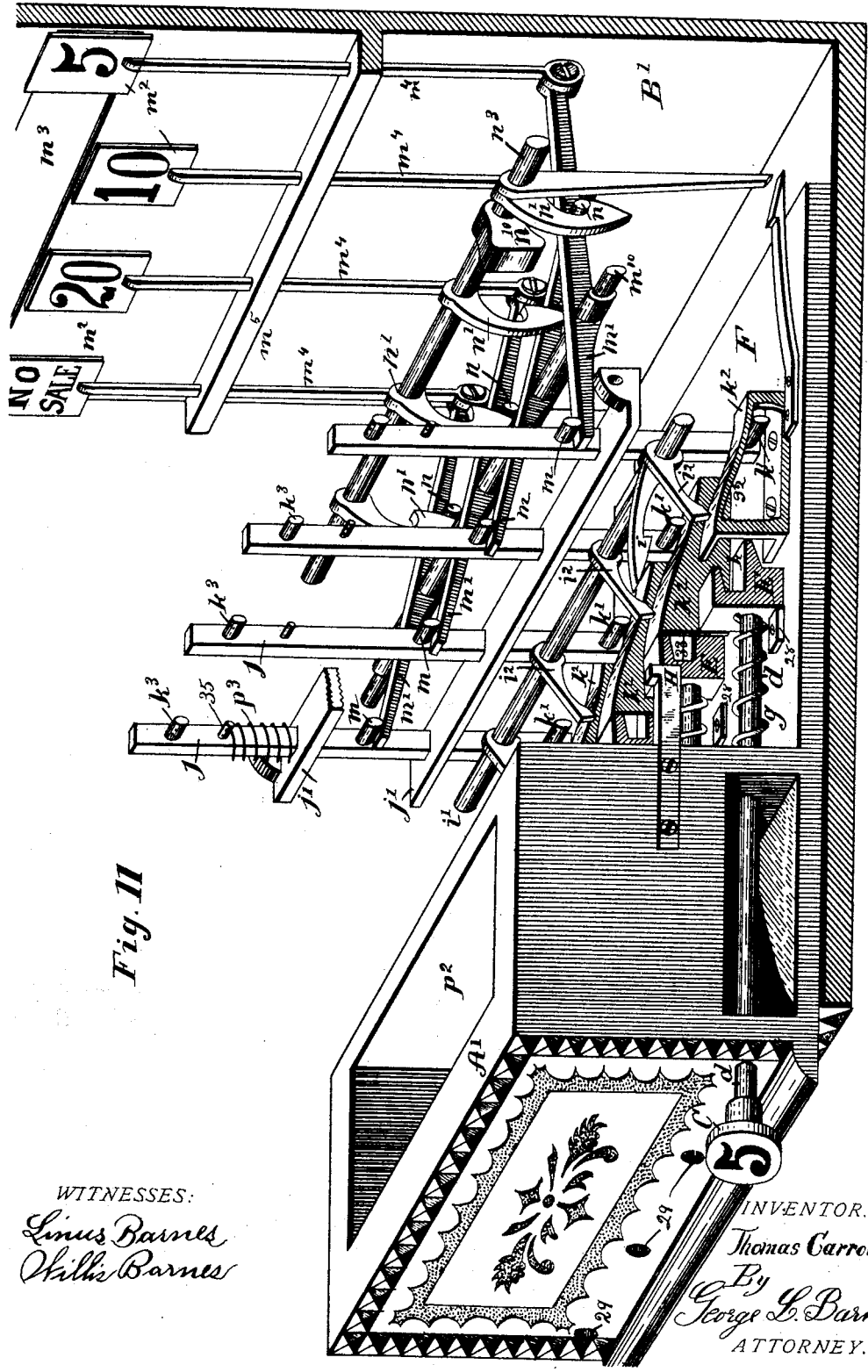

Figure 1 is a front view of a cash register and indicator, embodying my improvements, and of the class adapted to register all amounts from one, up to its full registering limit. Fig. 2 is a vertical section on the line $x\,x$ Fig. 5 showing the interior mechanism in side elevation. Figs. 3 and 4 show the action of the tripping mechanism. Fig. 5 is a rear view of the machine with the back of the case removed, showing the mechanism in rear elevation. Figs. 6, 7, 8 and 9 show details of the registering mechanism. Fig. 10 is a perspective view of a small sized cash register and indicator on my improved system, adapted for five cent sales and multiples of that amount up to thirty five cents, with the sides and top of the case removed to show the mechanism, one of the drawer pulls being withdrawn, the cash drawer released, ready to open, and the corresponding tripping mechanism set to effect the operative connection of the motive means and the registering and indicating mechanism. Fig. 11 is a view similar to Fig. 10, showing the cash drawer partly opened, with the trip operatively engaged with the motive means, and the corresponding indicator tablet exposed. Fig. 12 is a horizontal section on the plane of the drawer pulls, with the parts in the position shown in Fig. 10. Fig. 13 is a vertical section in perspective on the line $z\,z$ of Fig. 12, the cash drawer being shown partly opened, the trip engaged with the operating cam in the action of registering and throwing up the indicator tablet, and the indicator tablet exposed by the last preceding registration, on the point of being disengaged and dropped from view.

The object of my invention is to provide a cash register and indicator, in which the simple operation of drawing open the cash drawer by means of a knob or drawer pull, or series of knobs or drawer pulls of appropriate representative values, shall accomplish the announcement and registration of sales, and indicate the amount thereof.

The invention consists in the novel combination with suitable registry and indicator mechanism arranged in the case or frame, of a series of handles, knobs or drawer pulls exteriorly mounted upon the cash drawer, having operating connections or rods individually guided and adapted to a limited independent movement therein, and of novel motive mechanism carried on the drawer and adapted to actuate the registry and indicator mechanism, and tripping mechanism corresponding to the series of drawer pulls adapted to operatively connect the motive mechanism of the drawer with the registry and indicator mechanism corresponding to the drawer pulls, or combination of drawer pulls manipulated, as determined by the initial independent action thereof. The invention further consists in the novel drawer locking and releasing mechanism, and in the construction of parts, as hereinafter more fully described and claimed.

The principle disclosed in my improved cash register dispenses with the use of the ordinary system of keys, and springs for propelling the drawer outward, its opening being effected by the direct pull of a knob or series of knobs having a slight travel relative to the drawer, whereby the locking mechanism is released and the corresponding trips are caused to operatively connect the registry and indicator mechanism with motive means on the drawer, which in its outward travel actuates the registry mechanism, and indicates the sale, without blows upon keys, compression of propelling springs, or violent darting motion of the drawer. The number, combination, and values of the drawer pulls or knobs may obviously vary indefinitely, according to the requirements of different machines. For instance, a common form of register adapted for use in situations where sales invariably amount to five cents or some multiple of five, as a cigar store or restaurant, will comprise a series of drawer pulls, respectively representing the values five, ten, fifteen, twenty, and so on advancing by five, up to any required amount, each drawer pull having its own releasing, tripping, registering, and indicating mechanism. There would also usually be required another drawer pull and its train of mechanism, for the sole purpose of opening the drawer to make change, which knob would be labeled "No sale" or "Change" and would so indicate when called into use. Such machines might be made with twenty, ten, or as few as five drawer pulls, exclusive of the no sale knob, a registering capacity of twenty-five cents being sufficient for the sales at ordinary soda fountains. In a machine having five drawer pulls respectively representing the values five, ten, fifteen, twenty and twenty-five, amounts exceeding twenty-five cents may be registered by the manipulation of appropriate combinations of the knobs. Hence a cash register having three drawer pulls exclusive of the no sale knob, and respectively numbered 5, 10 and 20, is adapted to register amounts up to thirty five cents, which is the sum total of the said three values. Such a machine is shown in Figs. 10 to 13 inclusive of the drawings.

A cash register which is required to register sales of any amount from one up to two thousand inclusive, will involve the use of twenty nine knobs or drawer pulls exclusive of the special or "no sale" knob required for opening the drawer to make change. Of the aforesaid twenty nine drawer pulls, nine will respectively represent the units one to nine inclusive, nine will represent the tens ten to ninety inclusive and nine will represent the hundreds, one hundred to nine hundred inclusive. The twenty eighth knob will register one thousand, the twenty ninth knob two thousand, and if it is desired to extend the system beyond such registering capacity, thousand knobs would be added, up to nine thousand, ten-thousand knobs up to ninety thousand, and so on to any number desired. A cash register of that class is shown in Figs. 1 to 9 inclusive of the drawings.

To simplify the description, as the difference between the aforesaid several styles of cash registers relates wholly to the number of knobs or drawer pulls employed, the various accompanying mechanisms being simply duplicated proportionately, I will first describe a single set of mechanism, that is the mechanism pertaining to a single drawer pull. Any set or train of mechanism in any of the figures or the styles of apparatus shown may be taken as the subject of the description, except as the parts are referred to as being in set, tripped, engaged, disengaged, raised, lowered, open or closed positions, all of which are fully illustrated in the various figures. And similar letters and figures of reference denote similar or analogous parts of the mechanism throughout the drawings, without regard to the various styles of apparatus shown, or the different representative values of the duplicated sets of mechanism.

Referring to the drawings A in Figs. 1 to 5 inclusive, and A' in Figs. 9 to 13 inclusive designate the cash drawer, suitably arranged and fitted to slide in the case or inclosing frame of the cash register, which is denoted by the letter B in Figs. 1 to 5 inclusive and B' in Figs. 8 to 12 inclusive. Exteriorly arranged on the front of the drawer are the knobs or drawer pulls C, in a series of thirty, in the class of register shown in Figs. 1 and 2 and numbering four in the smaller machine shown in Figs. 10 to 13 inclusive. The drawer pulls are mounted upon operating shanks or rods $d$ which are extended through the drawer beneath the till $p^2$, or cash receptacle proper of the drawer, and guided and adapted to a limited travel or free independent movement therein. Secured on the inner end of each rod or operating shank $d$ is a head E, which rests upon the rearwardly projecting base F of the drawer, and, in the aforesaid limited travel of the drawer pull and its rod $d$, is adapted to slide thereon. The drawer pull, rod $d$ and head E thus comprise a single operating part, which is normally held back or retained at the rearward limit of its travel, by a spiral spring $g$, which is coiled around the rod, and compressed into the space between the head E and the rear side of the cash drawer. When compressed, said springs and the drawer will limit the travel of the operating shanks $d$ in their bearings 29, unless stops, as 28, for engaging the heads E are provided.

Directly forward and in the path of the heads E is a corresponding series of operating dogs or swing arms $i^2$ suspended from and fixed upon a shaft or arbor $i'$ arranged transversely of and adapted to oscillate in the case or frame suitably journaled therein. A latch $i$ is secured upon the arbor $i'$ near one end thereof and adapted to swing with the motion of the arbor and the series of operating dogs $i^2$. The latch is adapted to engage a suitable hook H on the drawer, when the drawer is in closed position, thereby locking it shut. The weight of the latch and the operating dogs is alone sufficient to cause the interlocking of the latch and hook as the drawer is closed, and a suitable stop should be provided to prevent the latch from dropping below its normal position whenever the hook is disengaged therefrom. A simple stud 31 inserted in the side of the case beneath the latch as shown in Fig. 12 is sufficient for this purpose.

The series of heads E normally supports a corresponding series of vertical rods or trips $j$, which are guided and adapted to slide freely in suitable transverse guide frames or bars $j'$ secured to the case. Each trip is provided with a horizontal pin or projection $k'$ which is adapted to rest on the flat upper surface of the head E, thus supporting the trip in the elevated position, the trips being arranged in vertical planes which lie immediately alongside of, or offset from the planes of the heads E.

Secured upon the rearwardly projecting base F of the cash drawer, is a series of cams $k^2$ corresponding to, and arranged just in the rear of, the heads E, and also in the sliding planes thereof, that is, each cam lies in the same plane as the projection $k'$ of the corresponding trip. The operating flanges 32 of the cams are curved or inclined from a plane parallel to that in which the drawer moves, the front ends thereof being the highest, and arranged flush with the upper surfaces of the heads E, and with which they are normally in juxtaposition.

In the operation of the parts already described, the functions of the drawer pulls and their connections are to release or unlock the drawer, and trip or switch the aforesaid trips into operative engagement with the operating cams or motive mechanism of the drawer, the trips being provided with driving projections or shoulders $k^3$ and $m$ respectively adapted for operating the registering and indicating mechanisms by engagement with the levers or arms $k^4$ and $m'$ thereof, as hereinafter described. If any particular drawer pull is grasped and subjected to the strain of an outward pull as shown in Fig. 10, the spring $g$ will yield, and the rod $d$ and head E will travel forward in their bearings, the head E thereby being brought into engagement with the operating dog $i^2$, which movement raises and disengages the latch $i$ from the hook H, thus unlocking the drawer, which is then free to be opened by continued pulling upon the aforesaid knob or drawer pull. The said independent initial action of the drawer pull withdraws the head E from under the projection $k'$ of the corresponding trip, which thereupon immediately falls, the said projection dropping into the space thus created between the head E and the corresponding operating cam $k^2$. The fall of the trip is regulated and limited by the positions of the projections $k^3$ and $m$ aforesaid, which are placed sufficiently above the levers or arms $k^4$ and $m'$, assuming the trip in its highest position, to permit the trip to fall far enough to bring the projection or pin $k'$ into position for the leading or highest end of the flange of the operating cam to pass over it in the opening movement of the drawer. If desired, a projecting shelf $k$ may be provided on each head to arrest the fall of the trips, and the heads should be recessed on a line with the shelf $k$, to form pockets 33 into which the projection $k'$ may enter as the head E is retracted by the spring $g$, when the drawer pull is released from the grasp in manipulating a combination of drawer pulls.

The tension of the springs $g$ is very slight, and less than the force required to overcome the friction and inertia of the drawer. Therefore the drawer will not open by the reactionary effort of the spring after the release of the locking mechanism, nor until additional force has been brought to bear upon it, sufficient to overcome the aforesaid friction and inertia. Also the parts may be proportioned and adjusted so that in the initial movement of the engaging heads, the trips will drop just before the disengagement of the latch and hook takes place. Therefore any desired combination of drawer pulls may be manipulated, and the corresponding trips switched into operative relation with the operating cams before the drawer is unlocked, or, if the drawer is unlocked in the process, the latch and hook will re-engage, if the pull upon the knob is not violent. The fall of the trip may be accomplished by gravity alone, or if desired, a spring $p^4$ may be arranged to act downward on the trip to render the action more certain. When by the independent initial action of a drawer pull or a combination of drawer pulls, the cash drawer has been unlocked, and the corresponding trip or trips switched into operative relation to the motive mechanism, as shown in Fig. 9, continued pulling upon the last drawer pull manipulated will draw out or open the cash drawer. In such motion of the drawer the operating cams $k^2$ will engage such of the pins $k'$ as have been tripped by initial movement of the drawer pulls, and will actuate said trips downward, as shown in Figs. 11 and 13 in which the mechanism of the five cent drawer pull is shown in operation. Such downward movement of the trip will actuate the lever $k^4$ of the registering mechanism, by engagement of the driving projection $k^3$ therewith, and register the action as hereinafter described. The pin $m$ will also engage and depress one end of the lever $m'$ thereby throwing up the opposite end thereof and the corresponding indicator tablet, as hereinafter described.

The restoration of the trips to their original or normal positions after the cams have passed over and off from the projections $k'$ is in part effected by springs $p^3$ coiled around the trips and adapted to be compressed under the pins 35 therein, as the trips are forced downward by the cams $k^2$. The adjustment of the said springs is such that they offer no resistance to the initial drop of the trips, but will normally hold the trips in about the same position as they would be supported by the shelves $k$. At that height the cams readily pass under the pins $k'$ of the trips on the return or closing movement of the drawer, as shown in Fig. 11, by the relation of trips and cams of the ten cent, twenty cent and no sale drawer pulls, thereby forcing the trips up to place on the heads E, by impact of the projections $k'$ with the upper surfaces of the flanges of the cams. Also, it will be seen that said springs will support such of the trips as are not disengaged by manipulation of the drawer pulls, and prevent them from dropping too far after the cams have passed from under them, for it will be understood that in the opening movement of the drawer the cams must slide under all the projections $k'$ not previously tripped into position to be engaged by the flanges of the operating cams. The pins 35 in the trip engage the lever $k^4$ to restore them to their normal positions, on the upward travel of the trip.

The indicator mechanism is duplicated for each knob or drawer pull, the representative value or number of which is identical with the particular indicator tablet pertaining thereto. The tablets are exposed by means of the opening action of the drawer, as follows, reference being had particularly to Fig. 11, in which the five cent tablet is shown exposed and retained in place, and Fig. 13, in which the five cent tablet is shown nearly raised into full view and the ten cent tablet, supposed to have been raised by the last preceding sale, is shown in the act of being dropped from the exposed position, as hereinafter described: As the trip $j$ is lowered by the action of the cam $k^2$, through the outward movement of the drawer, a pin $m$ on the trip engages and depresses one end of a lever $m'$, hung on the arbor $m^{10}$ in the case. The opposite end of said lever is thereby raised, thus elevating the rod $m^4$ attached thereto, and adapted to slide vertically in the guides $m^5$, whereby a suitable indicator tablet $m^2$ on the upper end of the rod $m^4$ is raised and exposed to view through the slots $m^3$ in the case. The said indicator tablet will be held in such raised position while the cam $k^2$ is in engagement with the pin $h'$ at the lower end of the trip, during which interval the spring hook $n^4$ on the base F successively engages, swings, and releases the lower end of a lever $n^2$ depending from an arbor $n^3$ which carries a series of pawls or hooks $n'$, corresponding in number to the number of knobs or handles of the drawer, and each adapted to engage a pin $n$ on the particular lever $m'$ to which it corresponds or is associated with. Such engagement takes place when the pin $n$ is first raised, the lever $n^2$ being actuated by a suitable weight $n^{10}$ on the arbor $n^3$, but the engagement is not then permanent, owing to the subsequent swing of the lever by contact with the spring hook $n^4$, as hereinbefore explained. Meanwhile, however, during the vibration of the lever $n^2$, the indicator tablet is maintained in elevated position by the engagement of the cam $k^2$ with the pin $k'$ of the trip $j$, and before the said cam has passed entirely off from the pin $k'$ the lever $n^2$ will have been released by spring hook $n^4$ and swung back to the normal position shown in Fig. 2, and the hook or pawl $n'$ will have swung back and reengaged the pin $n$ on the lever $m'$, whereby the indicator tablet will be retained in the elevated and exposed position until the succeeding opening movement of the drawer, the spring hook $n^4$ yielding and passing under the lever $n^2$ on the return or closing movement of the drawer. But it will be seen, that, owing to the vibration of the series of hooks or pawls $n'$ caused by opening the drawer, the indicator tablet or tablets left exposed by the preceding opening movement of the drawer will be released and allowed to fall out of sight, leaving only the new series of tablets which is exposed by such opening action of the drawer. The spring hook $n^4$ is also adapted to engage a spring actuated lever $n^5$ carrying a hammer $p$, adapted to strike a bell $p'$ in the case, as the drawer is opened, thus announcing the action.

The cavity $p^2$ in the cash drawer is set a sufficient distance back from the front edge of the case to prevent access thereto until in the movement of the drawer the cam $k^2$ has passed entirely over the pin $k'$ and thus operated the registering, indicating and announcing mechanism.

The method of registering sales by means of my improved cash register is as follows: On each of the trips $j$ near the upper end thereof, is a pin or projection $k^3$ which in the depression of the trip by means of the cam $k^2$, is adapted to engage and swing an arm $k^4$ mounted on an arbor $k^5$ which supports a series of registering tape reels $l$. Each of said arms has a hooked pawl $l'$ pivoted thereto, and adapted to engage the teeth of a suitable ratchet $l^2$ on each tape reel $l$. The said ratchets are held against backward movement, or slip, by the retaining pawls $l^5$ hinged on the horizontal bar $l^6$ in the case. Rolls $l^4$, corresponding in number to the said tape reels, and hereinafter more fully described, are arranged in revolving planes corresponding to the revolving planes of the reels, and adapted to receive suitable tapes $l^3$ of strong ribbon or other suitable material, coiled thereon, the opposite ends of the tapes being attached to the tape reels $l$. The tapes are graduated and each bears a series of numbers, arranged in arithmetical progression, having the number or representative value of the corresponding drawer pull for the lowest term and also the common difference of the series, and ascending from the ends attached to the reels $l$. That is, starting with the number of the knob or drawer pull to which a given tape pertains, the series of numbers will comprise the multiples of that number in the numerical order, as for instance, the tape of the units drawer pull No. 1 will be numbered 0, 1, 2, 3, 4 and so on up to any desired number. The tape of the units drawer pull No. 5 will be numbered 0, 5, 10, 15, 20 and so on upward. The tape pertaining to the tens drawer pull No. 5 will bear the numbers 0, 50, 100, 150, 200, and in that order up to any desired limit.

In the operation of the registering mechanism, all the tapes are first set at zero, by means of the mechanism hereinafter described, the zero point or line being preferably indicated by means of a horizontal bar $r$ fixed transversely of the case, over and adjacent to the tape reels $l$. Said bar facilitates the reading of the tapes, when the interior of the case is exposed to view by the removal of a portion of the top or cover thereof, in any ordinary or suitable manner.

It will be seen from the foregoing description, that if the cash drawer be opened by pulling one of the drawer pulls, the tape pertaining to such drawer pull will be ratcheted upon its reel $l$, one division upward, bringing the number next succeeding zero up to the reading bar and into view, thus registering the sale. Pulling the same knob, will successively bring multiples of the number of the knob up to the reading bar $r$, also throwing up the corresponding indicator tablet.

It will be understood that the mechanism described, with the exception of the latch $i$, levers $n^2$ and $n^5$, the weight $n^{10}$ and bell $p'$ and spring $n^4$ being duplicated for each knob, the manipulation of two knobs at a single opening of the cash drawer, respectively corresponding to units and tens of the series of knobs, will register a number of two places of figures. For instance, to explain the operation, let it be desired to register a sale of fifty seven cents. Then the fifth knob of the tens series, and seventh knob of the units series will be pulled to open the cash drawer, and the numbers 50, and 7 will be brought up to the reading bar, as before explained. And supposing the operation to be repeated four times the readings will stand as follows: 200 on the tens tape, and 28 on the units tape, which added, amount to two hundred and twenty eight, the sum of the four sales. Thus the addition of the collective readings of all the tapes, gives the sum of all the sales subsequent to setting the mechanism at zero. The indicator tablets $m^2$ are numbered to correspond to the values of their respective knobs, and therefore any combination of them will correctly designate the amount which tallies with the corresponding combination of knobs.

To register amounts exceeding ninety nine cents and ending in figures other than ciphers, the combination of three knobs will be required, and it will be seen that any combination of figures may be registered by the use of a proportionate number of knobs in the mechanism. It is immaterial in registering numbers of a plurality of figures, which knob is pulled first or whether all the knobs are pulled singly or together, provided that the drawer is not opened until after the withdrawal of all the knobs required.

To insure the convenient and accurate setting of the tapes at exactly zero I provide novel mechanism as follows: The tape rolls $l^4$ are placed between friction collars $r'$ fitted on the rectangular arbor $r^2$, and sufficient frictional resistance is imposed on the rolls by means of a spring $r^3$, or other suitable means, to prevent the rolls from turning freely on the arbor. Thus while the rolls will revolve on their collars, as the tapes are ratcheted from them on the reel $l$, they will normally remain fast on their arbors, and may be turned backward therewith, when the pawls are raised from engagement with the ratchets $l^2$ and $l^5$. Any desired suitable means may be provided for turning the said arbor for the purpose of winding the tapes on the rolls thereof. Thus the arrival of a roll at zero, in no wise prevents the winding of the rest till all are wound.

Figure 6:
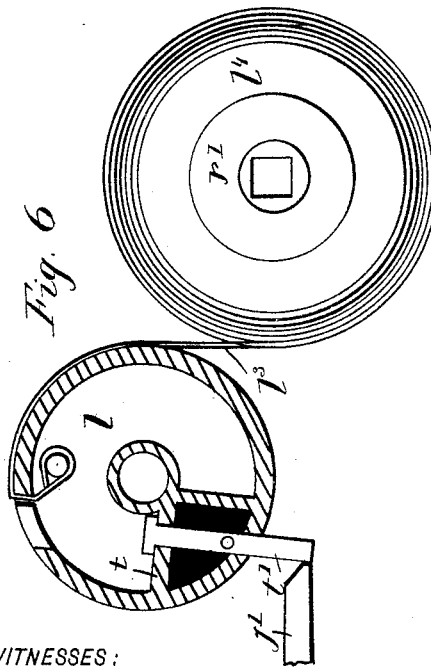
Figures 7, 8:
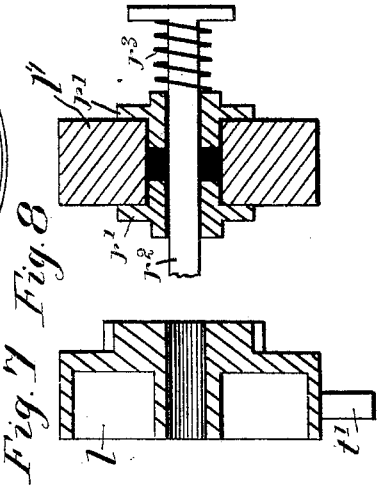

Figs. 6, 7 and 8 show the construction of the tape reels $l$ which are hollow or recessed as shown, and each provided with an internal perforated projection $t$ adapted to support and guide a pin $t'$ which when the tape is being set at zero, drops down below the periphery of the reel, and engages the guide $j'$ thereby always accurately stopping the reels at a given point, or zero mark. But as the tape is wound upon the reel, the said pin is thereby pushed within the reel by contact with the tape, offering no obstruction to the uniform winding of the tape. Each pawl $l'$ is provided with a projection $t^2$ overhanging the pawl $l^5$, whereby by lifting the pawl $l^5$ by means of an eccentric rod $t^3$ arranged underneath the pawls $l^5$ horizontally of the case, the entire series of pawls may be simultaneously disengaged from the ratchet $l'$, and the tape reels thus left free to be turned backward as the tapes are wound upon the rolls $l^4$ in resetting the mechanism.

I claim as my invention and desire to secure by Letters Patent—

1. In a cash register, the combination with an inclosing case, of a cash drawer, a locking hook thereon, a latch for engaging the locking hook and a series of operating dogs or arms connected with the latch, a series of movable knobs or handles and their rods or operating shanks, guided in the drawer, engaging heads thereon having their planes of motion coincident with the vibrating paths of the said operating dogs; springs for retaining the knobs' shanks, and engaging heads at the rearward limit of their travel, a series of trips guided in the case normally supported by the said engaging heads, a series of operating cams for depressing said trips in the forward movement of the drawer and elevating them on the return travel thereof, a series of pawls operated by the said trips, suitable ratchets, and reels operated by the said pawls, retaining pawls, graduated tapes or registry ribbons attached to and adapted to be wound upon said reels, and rolls for supporting the said tapes, substantially as and for the purpose specified.

2. In a cash register, the combination with an inclosing case, of a cash drawer, a locking hook thereon, a pawl for engaging the locking hook and a series of operating dogs or arms connected with the pawl, a series of movable knobs or handles and their rods or operating shanks guided in the drawer, engaging heads thereon having their planes of motion coincident with the vibrating paths of the said operating dogs, springs for retaining the knobs' shanks and engaging heads at the rearward limit of their travel, a series of trips guided in the case normally supported by the said engaging heads, a series of operating cams for depressing said trips in the forward movement of the drawer and elevating them on the return travel thereof, a series of pawls operated by the said trips, suitable ratchets and registry mechanism graduated to correspond to the vibrations of the pawls, numbered to correspond to the numbers of the respective knobs and multiples thereof in their numerical succession, all arranged substantially as and for the purpose specified.

3. In a cash register, the combination with an inclosing case of a cash drawer, a locking hook thereon, a pawl for engaging the locking hook and a series of operating dogs or arms connected with the pawl, a series of movable knobs or handles and their rods or operating shanks guided in the drawer, engaging heads thereon having their planes of motion coincident with the vibrating paths of the said operating dogs, springs for retaining the knobs' shanks and engaging heads at the rearward limit of their travel, a series of trips guided in the case normally suported by the said engaging heads, a series of operating cams for depressing said trips in the forward movement of the drawer and elevating them on the return travel thereof, a series of pawls operated by the said trips, suitable ratchets and reels operated by the said pawls, retaining pawls, graduated tapes or registry ribbons attached to and adapted to be wound upon said reels, and rolls for supporting the said tapes, a series of indicator tablets corresponding to the operating knobs, a series of levers or operating mechanism carrying said indicator tablets and operated by the said trips to expose the tablets through a suitable sight aperture, a series of retaining hooks adapted to lock the operating mechanism of the indicator tablets to retain the tablets in their exposed positions, releasing means for disengaging said tablets' locking mechanism by the forward movement of the cash drawer, a gong, and striking mechanism, all arranged substantially in the manner and for the purpose specified.

4. The combination with the cash drawer, of the movable knobs C and rods or shanks $d$, the heads E, springs $g$, the hook $i$, dogs $i^2$, trips $j$ having pins $k$, $k^3$ and $m$, the levers $m'$ having pins $n$, the rods $m^4$, indicator tablets $m^2$, the retaining hooks $n'$ weight $n^{10}$, release arm $n^2$, the hook $n^4$, the arms $k^4$, the pawls $l'$, retaining pawls $l^2$, the ratchets $l^2$, reels $l$, registering tape $l^3$, tape rolls $l^4$, and the disengaging means for raising the retaining pawls $l^5$, all arranged substantially in the manner and for the purpose specified.

5. In a cash register the combination of the cash drawer, the movable knobs and their rods, the engaging heads, the trips $j$, the arbor $k^5$, pawls operatively connected with said trips, a series of independent reels $l$ and their arbor, ratchets connected to the reels and adapted to be engaged by the pawls, the movable stop belts $t'$ adapted to project exterior to the peripheries of the reels, the stop $j'$ for the engagement of the bolts, a series of tape rolls $l^4$ for supporting the registry tapes when unreeled, the graduated tapes, $l^3$ friction means substantially as described for carrying the rolls with their arbor, the retaining pawls $l^5$ and means for simultaneously disengaging the said retaining pawls from their ratchets, all as specified.

6. In a cash register the combination of an inclosing case, a cash drawer therein, a series of exterior knobs or drawer pulls having operating shanks or rods guided and adapted to a limited independent movement in the drawer, means for locking the drawer in the case, comprising a fixed hook and a vibrating latch relatively mounted upon the drawer and case, a series of vibratory dogs or arms connected to swing conjointly with the latch, engaging means for operating said dogs and the latch to release the drawer, by initial movement of the drawer pulls, a series of registering and indicating mechanism mounted within the case or frame and corresponding to the series of drawer pulls, a series of motive mechanisms corresponding to the series of registering or indicating mechanisms and adapted to operate the same by the movement of the cash drawer, and a series of trip mechanisms corresponding to the drawer pulls and adapted to operatively connect the registering and indicating mechanisms, with the corresponding motive mechanism by the initial independent action of the drawer pulls, substantially as specified.

7. In a cash register the combination of an inclosing case, a cash drawer therein, a series of exterior knobs or drawer pulls having operating shanks or rods guided and adapted to a limited independent movement in the drawer and provided with engaging heads, locking means for securing the drawer in the case, comprising a fixed hook, a vibrating latch relatively mounted upon the drawer and the case, a series of vibratory dogs or arms corresponding to the engaging heads and connected to swing conjointly with the latch by initial action of the drawer pulls, a series of operating cams mounted on the cash drawer corresponding to the drawer pulls, guide frames or bars mounted in the case, a series of trips guided in the said frames and adapted to reciprocating movement therein by engagement with the cams, means for tripping or switching the trips into operative engagement with the cams by initial action of the drawer pulls, a series of indicator tablets corresponding to the drawer pulls, arms or connections for supporting the tablets, pins or shoulders carried on the trips and adapted to engage said connections to actuate the tablets into exposed position, and holding mechanism for sustaining the tablets in exposed position, substantially as specified.

8. In a cash register the combination with a series of registering wheels and their actuating pawls and ratchets, of an inclosing case, a cash drawer therein, a series of exterior knobs or drawer pulls having operating shanks or rods guided and adapted to a limited independent movement in the drawer and provided with engaging heads, a hook carried upon the cash drawer, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement in the case normally supported by the engaging heads and adapted through release by the initial action of the drawer pulls, to be tripped or switched into operative engagement with the cams, said trips being operatively connected with and adapted to actuate the registering mechanism, and provided with driving projections or shoulders for engagement with the cams, substantially, as specified.

9. In a cash register the combination of an inclosing case, a series of exterior knobs or drawer pulls having operating shanks or rods guided and adapted to a limited independent movement in the drawer and provided with engaging heads, springs for retracting the drawer pulls and connections, a hook carried upon the drawer, an arbor journaled in the case and provided with a latch for engaging said hook to lock the drawer in closed position, a series of operating dogs mounted upon said arbor in the paths of the engaging heads, for releasing the latch by initial movement of the drawer pulls, a series of operating cams mounted on the cash drawer, corresponding to the drawer pulls, a series of movable trips guided in the case normally supported by the engaging heads and adapted through release by the initial movement thereof to be tripped or switched into operative engagement with the operating cams, a series of indicator tablets corresponding to the drawer pulls, a series of levers for supporting the tablets, arranged in operative connection or engagement with the trips, a series of holding hooks or latches, and retaining studs for securing the indicator tablets in exposed position, and the release mechanism for disengaging the same substantially as and for the purpose specified.

10. In a cash register the combination of an inclosing case, a cash drawer therein, a series of exterior knobs or drawer pulls having operating shanks or rods guided and adapted to a limited independent movement in the drawer and provided with engaging heads, springs for retracting the drawer pulls and connections, a hook carried upon the cash drawer, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement or travel in the case normally supported by said engaging heads and adapted through release by the initial action of the drawer pulls to be tripped or switched into operative engagement with the cams, a series of indicator tablets corresponding to the drawer pulls, a series of independent levers supporting the tablets, actuating pins or shoulders carried by the trips and adapted to engage the said levers to actuate the tablets into exposed position, holding mechanism comprising a series of hooks and studs for retaining the tablets in exposed position, a weight for swinging the same into engagement, a release lever connected with the holding mechanism, and a releasing latch carried on the drawer and adapted to release the holding mechanism and exposed tablets by the action of the drawer, substantially as specified.

THOMAS CARROLL.

Witnesses:
GEORGE L. BARNES,
PATRICK HOGAN.